Figures 2, 3:
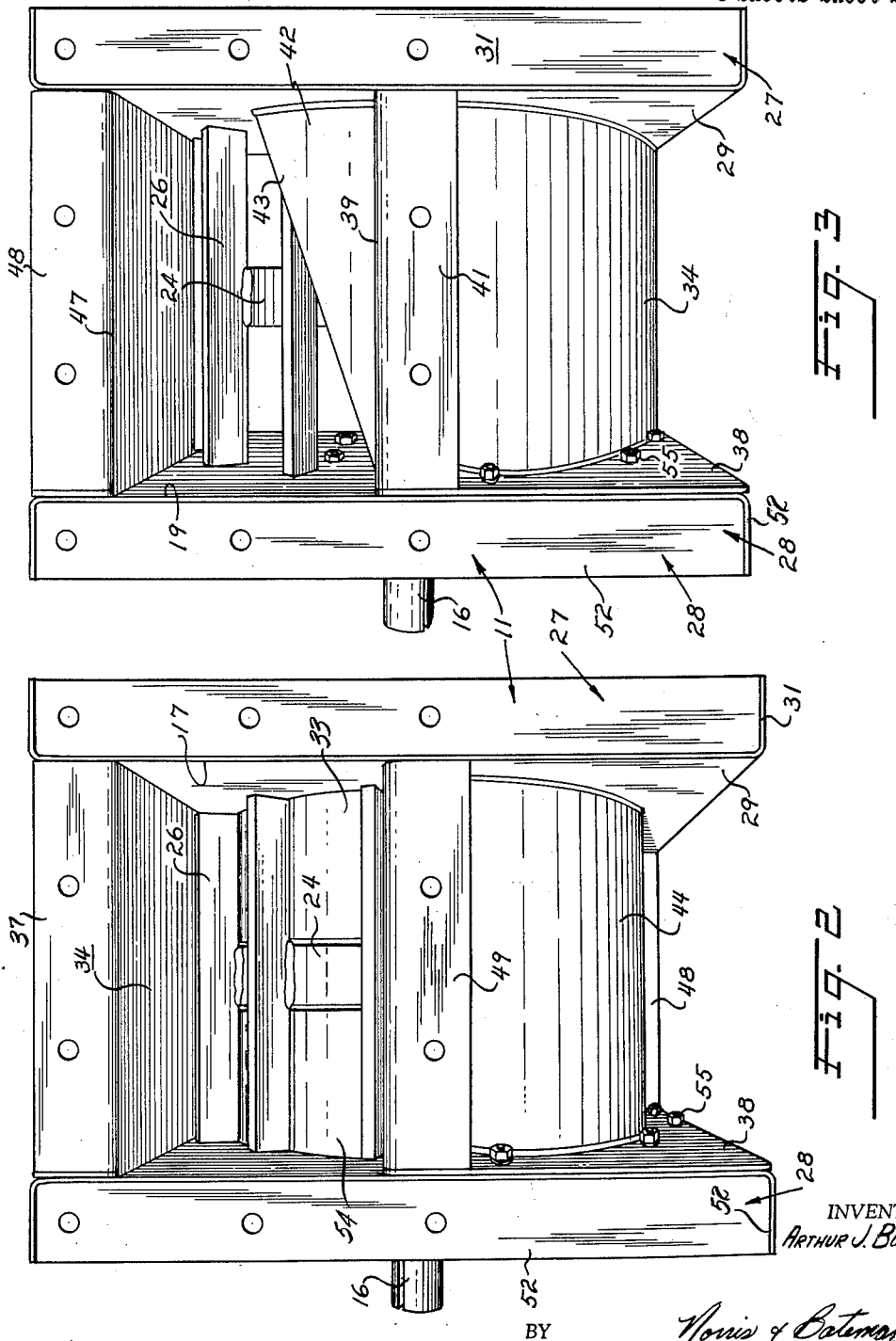

Jan. 8, 1963  A. J. BURKE  3,072,301
ROTARY FEEDER FOR BULK MATERIAL
Filed April 3, 1959  4 Sheets-Sheet 1
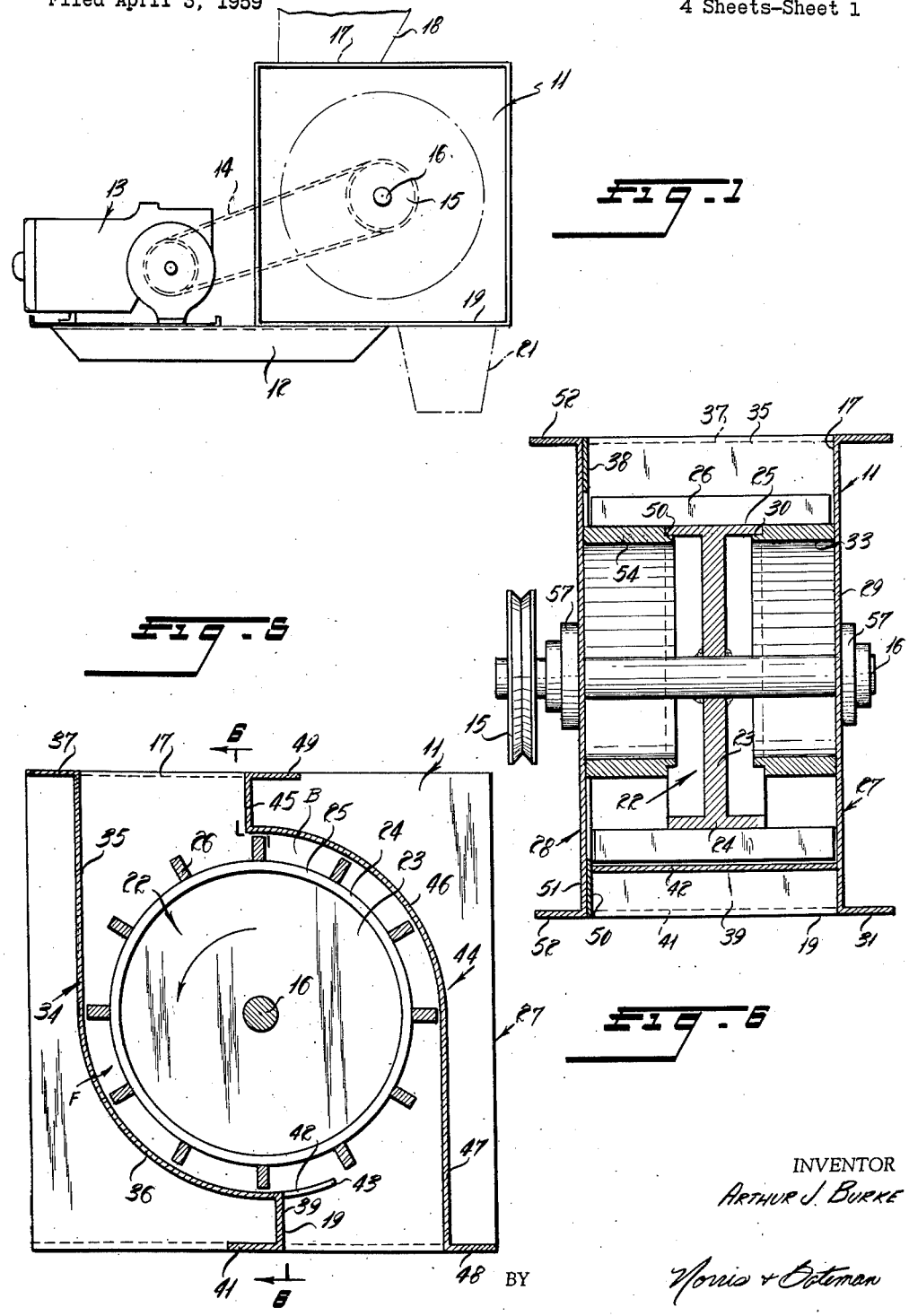
INVENTOR
ARTHUR J. BURKE
BY Norris & Bateman
ATTORNEYS Jan. 8, 1963  A. J. BURKE  3,072,301
ROTARY FEEDER FOR BULK MATERIAL
Filed April 3, 1959  4 Sheets-Sheet 2

INVENTOR
ARTHUR J. BURKE
BY
Norris & Bateman
ATTORNEYS

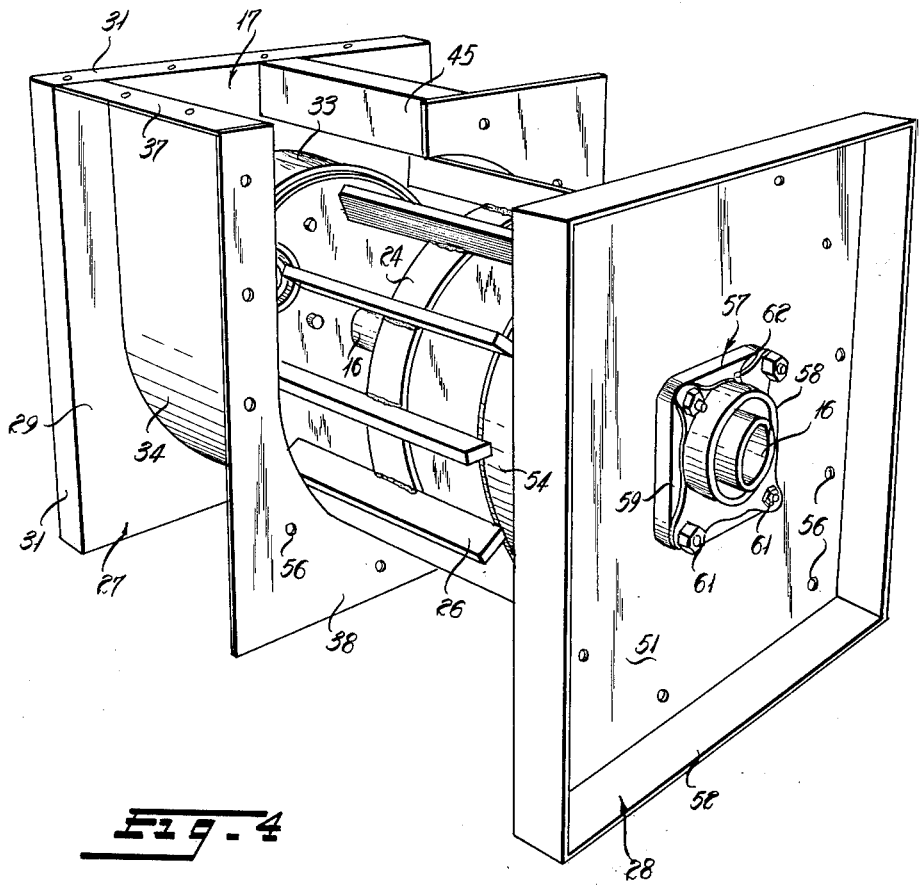

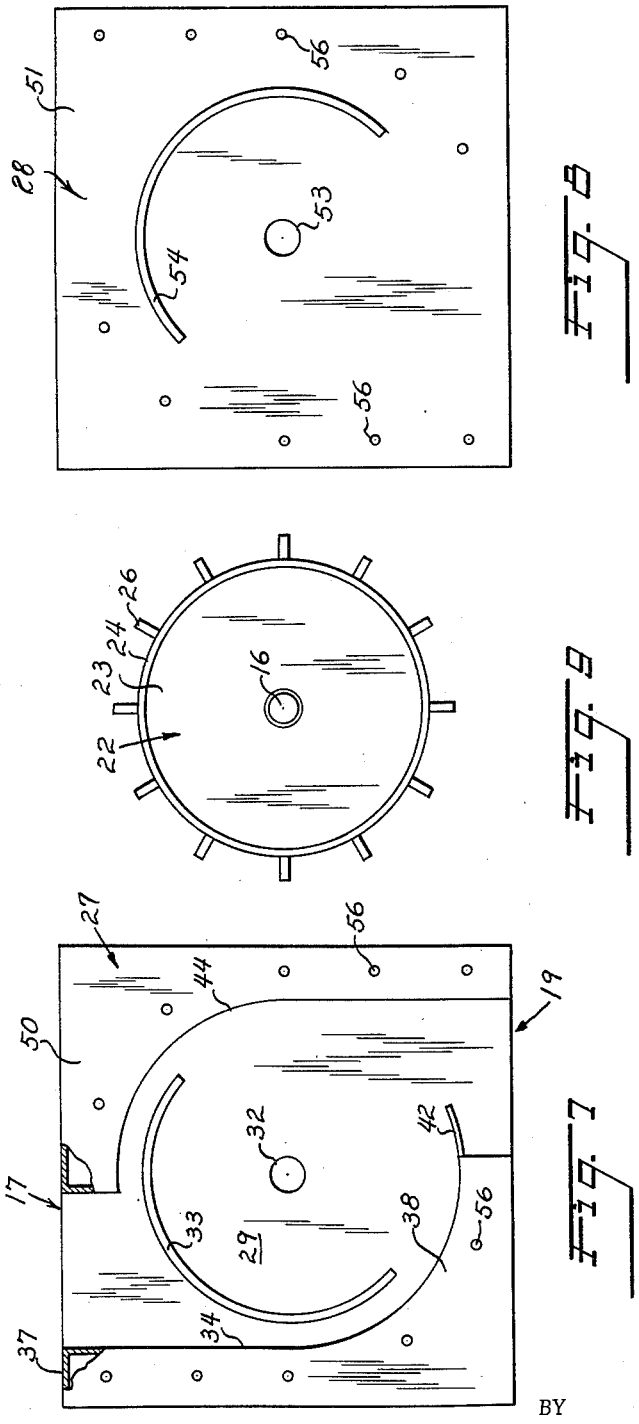

United States Patent Office 3,072,301
Patented Jan. 8, 1963

3,072,301
ROTARY FEEDER FOR BULK MATERIAL
Arthur J. Burke, Oakland, N.J., assignor to Richardson Corporation, a corporation of New Jersey
Filed Apr. 3, 1959, Ser. No. 803,926
9 Claims. (Cl. 222—342)

This invention relates to material feeding apparatus and particularly to a paddle type feeder for pulverant materials.

The present invention is particularly adapted for the controlled feeding of batches of bulk materials ranging in characteristics from fine powders to granular meals from a source into weighing apparatus or the like.

Common problems encountered in weighing successive batches of such material are that the material may tend to move not in a controlled smooth stream but either rather intermittently with resultant uneven shocks on the weigh scale, or continuously and so freely as to simply flush through the usual feeding device, both being objectionable in that it is extremely difficult to provide suitable accurate cut off control when the desired weight has passed to the scale. The invention solves this problem by providing smoothly controlled feeding of such materials so as not to interfere with weighing accuracy.

This device has advantages over other feeds used for handling these types of materials.

Compared to a vane feeder, the advantages are:
(1) The rotor bearings are away from volumes where material can be packed and under pressure.
(2) The material is discharged in a continuously smooth and non-pulsing stream.
(3) There is greater certainty that material will discharge from the feeder as only small areas of the pockets move with the material.
(4) Material run-through is prevented by providing for the natural angle of repose of material to establish the material seal. Accordingly larger particle materials which require larger clearances can be handled.

Compared to a belt feeder, the advantages are:
(1) Less horizontal offset of feed to discharge.
(2) Design is self cleaning. Any leakage of material is picked up by the stream.
(3) More positive feedings as a consequence of the compartmented volumes.

Compared to a screw feeder, the advantages are:
(1) Less horizontal offset of feed to discharge.
(2) More even discharge.

The invention in its preferred embodiment to be hereinafter described comprises a device into which the material may be uncontrollably delivered but at an adequate rate and which contains a paddle feeder arrangement that continuously picks up the material at the inlet and moves volumetrically measured charges toward the outlet, at the same time preventing any other appreciable passage of the material to the outlet.

It is therefore a major object of the present invention to provide a novel paddle type feeder for controlled feeding of pulverant or granular material.

It is a further object of the invention to provide a novel type feeder for material wherein the paddles and internal passage walls are such that only material which is picked up and moved by the paddles passes through the feeder.

It is a further object of the invention to provide a novel type feeder for material wherein the material is moved through the feeder by paddles of a rotor sweeping through a generally cylindrical passageway.

A further object of the invention is to provide a novel paddle type feeder having a novel rotor construction.

It is a further object of the invention to provide a novel type feeder wherein the rotor bearings are external and entirely out of the path of the material being fed.

Further objects of the invention will appear as the description proceeds in connection with the appended claims and the annexed drawings wherein:

FIGURE 1 is an end elevation of the feeder apparatus according to a preferred embodiment of the invention;
FIGURE 2 is a photographic top plan view;
FIGURE 3 is a photographic bottom plan view;
FIGURE 4 is an exploded view showing the general relationship of parts;
FIGURE 5 is a vertical transverse section showing internal structure;
FIGURE 6 is a section on line 6—6 of FIGURE 5 showing further internal structure;
FIGURE 7 is a side elevation of one end of the housing viewed from the inside;
FIGURE 8 is a side view of the other end of the housing viewed from the inside; and
FIGURE 9 is an end view of the rotor.

FIGURE 1 illustrates the invention in an environment wherein the feeder housing 11 is mounted on a support 12 also carrying an electric motor unit 13 which drives a belt 14 connected to pulley 15 on shaft 16 of a paddle rotor within the housing.

Housing 11 has a top entrance mouth 17 over which is posed a hopper 18 and a bottom exit mouth 19 for discharging into a receptacle 21. A rotor indicated at 22 is fixed on shaft 16 and consists of a web 23 having a continuous rim 24 having a cylindrical external surface 25 extending the same axial distance on each side from a plane through the center of web 23. A plurality of identical flat paddle bars 26 are symmetrically secured on rim 24, these paddles being spaced the same distance apart, here about 30° apart, and all project the same radial distance from the rim surface 25 so that their outer edges lie in a cylindrical envelope.

Paddles 26 are usually welded onto surface 25 and each extends the same axial distance on each side of rim 24. Thus the rotor is a rigid unit consisting of shaft 16, web 23, rim 24 and paddles 26.

Housing 11 consists essentially of two sheet metal parts 27 and 28 separable axially of shaft 16. Part 27 comprises a vertical side wall 29 formed with external peripheral flanges 31 that may be used to secure it to the support 12 or any other desired support. Wall 29 has a central aperture 32 to freely pass shaft 16 (FIGURE 7).

A cylindrically curved material guide baffle 33 is secured to the inner side of wall 29 as by welding and is concentric with aperture 32. Preferably baffle 33 extends over only about half a cylinder circumferentially, from a point well at one side of the inlet opening 17 across the opening and to a point well below it and short of the outlet opening as shown in FIGURE 7. Along its inner edge baffle 33 is formed with an undercut shoulder 30 which extends in the assembly under rim 24 in running clearance therewith as will appear. Openings 17 and 19 are displaced laterally, and the upper end of baffle 33 is located in vertical alignment with the center of outlet opening 19.

Projecting at right angles from wall 29 is a sheet metal side wall 34 consisting of a vertical section 35 extending down to the horizontal plane containing shaft 16 and cylindrically curved section 36 slightly more than a quadrant in extent coaxial with shaft 16 and extending to the edge of opening 19.

Wall 34 has an external top flange 37 level with top flange 31 and an external flat end flange 38 parallel to wall 29. At its lower end wall 34 has secured thereto as by welding a flat member 39 which forms one vertical side of exit opening, and at the lower end of member 39 is an externally projecting flange 41 which is used for attachment to the receptacle.

It will be observed that the lower edge of wall 34 extends beyond member 39 to form a lip 42 extending partly over opening 19 and having an edge 43 that is disposed at an acute angle to the rotor vanes 26, for a purpose to be described. Also note that member 39 is offset from the vertical plane containing the axis of shaft 16, in the direction of material feed, the rotor being rotated counterclockwise in FIGURE 5.

At the other side of the rotor a side wall 44 projects at right angles from wall 29 and comprises a short vertical top portion 45 that forms the opposite side of inlet opening 17, a cylindrical quadrant 46 that extends outwardly from the lower end of portion 45 concentric with shaft 16, and a vertical lower portion 47 that forms the other side of exit opening 19. At its lower end wall 44 has an outturned attachment flange 48 level with flange 41, and at its upper end wall 44 has an outturned attachment flange 49 level with flange 37. Wall 44 has on its inner end a flat flange 50 that is parallel to and coplanar with flange 38.

The other housing part 28 comprises a vertical wall 51 parallel to wall 29 with outturned peripheral attachment flanges 52 and a central aperture 53 to freely pass shaft 16. Concentric with aperture 53 is a semi-cylindrical baffle 54 secured as by welding to project inwardly at right angles to wall 51. Baffle 54 has along its inner edge an undercut shoulder 50 that extends under and in running clearance with rim 24 as will appear.

In the housing assembly flanges 38 and 50 abut flush against wall 51, and the parts are secured together by bolt and nut assemblies 55 passing through apertures 56 in the parts.

The stationary baffles 33 and 54 in the assembly are circumferentially coextensive and are both of the same radius and axial length and of nearly the same radius as rim 24, so that when the housing parts are secured together with the rotor in place the baffles 33 and 54 extend into substantially running clearance with the opposite side edges of rim 24. The shoulders 30 and 50 extend under the rim 24 and effectively provide a labyrinth seal along the opposite edges of the rim. This effectively provides that the smooth external cylindrical surfaces of 33 and 54 are closely swept over by the inner edges of the rotating paddles.

Further in the assembly when parts 27 and 28 are secured together the internal cylindrical surfaces at 36 and 46 are circumferentially coextensive, being of the same radius, and they are spaced radially from the cylindrical surfaces 24, 33, 54 a distance just greater than the radial dimension of the paddles 26 so that substantially only material moved by the paddles goes to the exit opening 19.

At its opposite ends, where it extends through walls 29 and 51, shaft 16 is supported in similar bearing units 57 each having a ball or like antifriction bearing assembly 58 carried by a support block 59 that is removably secured to each wall as by external bolts 61. When bolts 61 are drawn tight the assemblies seal apertures 32 and 53 against leakage of material dust. The bearing units 57 being located substantially above the lower edges of baffles 33 and 54, they are not exposed to any direct material or its pressure. A grease fitting 62 is provided on each bearing.

In use the feeder housing 11 is mounted as in FIGURE 1, the hopper 18 being attached to flanges 31, 37, 49 and 52 and the receptacle attached to flanges 41, 48, 31, 52.

Some of the chief uses of the feeder are to advance measured quantities of non-lumpy material like flour, carbon black, cement into the receptacle. The present invention insures that these materials, if finely powdered and almost as flowable as liquid, do not merely flow through the feeder. The close tolerances between the paddles and cylindrical surfaces below inlet opening 17 insure that the only material which reaches outlet 19 is that which has been moved through the annular cylindrical throat F of FIGURE 5 by the paddles.

The material entering through inlet 17 flows and is moved by paddles 26 toward throat F. The cylindrical surface consisting of rim 24 and baffles 33 and 54, with the labyrinth seals at shoulders 30 and 50, prevents the material from simply dropping through.

The edges of the paddles 26 approaching throat F approach wall 36 so that all of the material passing through throat F is contained between adjacent paddles and pushed between the cylindrical walls, and by the same token only material actually moved by the paddles reaches lip 42. The spaces between the vanes are full while moving through throat F, and the moving paddles continuously pick up full loads from the bottom of the material filling opening 17. As the material is moved out of throat F by the paddles it passes over inclined edge 43 with the result that an even and substantially continuous stream of material is delivered to the opening 19. The angularity of lip edge 43 is such that when material is being pushed off the furtherest projecting or widest part of lip 42 by one blade, the next blade starts to push material over the narrowest part of the lip (where it intersects the wall 39). This insures substantially continuous discharge into exit opening 19 even though parallel paddles are used. The angularity of lip 43 depends on the circumferential spacing of the paddles. The angle is essentially that between a line parallel to the axis of the rotor and a diagonal line connecting the opposite ends of successive paddles. Where the paddles are 30° apart the angularity of edge 43 is about 30° to the paddles.

By using parallel paddles all of the curves in the housing may be made cylindrical and the structure maintained simple and inexpensive. Special and complex curves and angles, with the attendant high costs of forming them, are eliminated. The parts may be readily fabricated by sheet metal and bar stock with welded joints and no complex castings are needed.

Applicant's external bearings are located out of the path of the material being handled, being externally mounted on the casing, and suitable shaft seals are provided, so that improved bearing life is assured. The baffles 33, 54 turn back any material seeking to move toward the bearings which are at all times remote and shielded from the material stream. The slight leakage through the seals at 30, 50 falls directly into opening 19 and does not affect the bearings. No material can flow downwardly through the throat B up which the paddles are moving in normal operation.

The foregoing construction removes a source of trouble hitherto constantly encountered in paddle feeders for fluent pulverant materials wherein the material being fed tended to clog the spaces between the rotor and the housing.

The invention provides a controlled relatively slow rate of substantially continuous uniform feed of a variety of material including fluent pulverant material, and this is particularly advantageous where the receptacle 21 discharges to an automatic weigher. Shocks and abrupt load changes are eliminated, and weighing accuracy is speeded and increased.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for controlled feeding of bulk material comprising a casing having spaced opposed walls, means defining substantially coaxial fixed cylindrical surfaces projecting toward each other from said walls internally of said casing, a rotor journalled in said casing and having a rim surface extending between and coaxially with said fixed surfaces, and paddles fixed to said rotor surface extending over said fixed surfaces with their inner edges adapted to sweep closely over said fixed surfaces during rotation of said rotor, said fixed surfaces providing an area over which said material is slidably moved by said paddles which is appreciably larger than the rim surface area that rotates with the moving material.

2. In the apparatus defined in claim 1, the adjacent edges of said rotor surface and said fixed surface defining means being formed to provide labyrinth seals preventing any material leakage of material therebetween.

3. In apparatus for feeding bulk material, means defining a stationary generally cylindrical concave outer material guide surface terminating at one end in an outlet opening, a rotor coaxial with said surface and having fixed peripheral paddles having material engaging and moving surfaces extending axially coextensively with said fixed surface and substantially parallel to its axis so as to displace material along said cylindrical surface during rotation of said rotor, and means providing an inclined edge at said outlet opening end of said fixed surface that is inclined relative to said paddle surfaces as they approach said edge during rotation of the rotor so that the material moved along said fixed guide surface by said paddles is discharged in a laterally progressive substantially continuous stream through said opening.

4. In a paddle type feeder for bulk material, a casing having end walls and opposite side walls each defining first fixed internal cylindrical material guide surfaces of the same radius of curvature, means providing second fixed internal cylindrical guide surfaces of the same radius of curvature projecting from said end walls into the interior of said casing spaced radially inwardly of and coaxial with said first named guide surfaces, a rotor having a shaft journalled on said end walls coaxially of said guide surfaces, a rim on said rotor extending between and substantially bridging the space between the inner ends of said second internal guide surfaces, and paddles fixed on the rotor rim projecting from both sides thereof into the radial space between said first guide surfaces and said second guide surfaces.

5. In the feeder defined in claim 4, said side walls and one of said second named internal surfaces being rigid with one of said end walls, said other second named internal surface being rigid with the other end wall, and means releasably securing said end walls together.

6. Apparatus for controlled feeding of bulk material comprising a casing having opposed side walls, an inlet at the top and an outlet at the bottom, a rotor journaled in said casing between and in spaced relation to said side walls on a horizontal axis below said inlet, said rotor having a continuous peripheral rim, means within the casing providing relatively stationary cylindrical surfaces substantially concentric with said rim and extending between said rim and opposite side walls, said rim and stationary surfaces forming the inner side of a material feed passage extending peripherally of the rotor between said inlet and said outlet, cooperating means on the casing defining the outer side of said passage, said passage having beyond said inlet a substantially cylindrically curved throat of substantially constant cross-section laterally extending between said side walls and terminating at least at said outlet, and paddles fixed on said rotor rim and projecting therefrom horizontally on both sides into said passage, said paddles being of such radial and lateral extent as to substantially occupy the entire cross-section of said passage throat with essentially running clearance as they move therethrough to feed said material from said inlet to said outlet.

7. The apparatus defined in claim 6, wherein said rim is relatively narrow so that the moving area of said rim exposed to contact with said material being moved is materially smaller than the stationary surface area at said inner side of the passage.

8. In apparatus for continuous controlled feeding of bulk material, a rotor having a rim and a plurality of circumferentially spaced paddles fixed to said rim and projecting therefrom on opposite sides parallel to the rotor axis, means defining a generally cylindrically curved material feed passage throat of substantially constant lateral cross-section extending around part of the periphery of said rotor and leading toward a discharge outlet, the radially outer side of said passage being formed entirely of relatively stationary surfaces and the inner side of said passage being formed by the rotor rim and laterally extending stationary surfaces at both sides of the rim, said paddles being of such extent as to project between all of said stationary surfaces whereby said material is displaced bodily by said paddles mainly over substantially stationary surfaces and only a relatively small passage surface area, namely that at the rotor rim, moves with the material being fed, so that the sticking of said material to the rotor and passage surfaces is reduced to minimum.

9. In the apparatus defined in claim 8, said paddles each having a leading material engaging surface lying in a plane parallel to the axis of rotation of said rotor, and means at said discharge outlet end of said throat providing an edge over which material is pushed by said paddles, said edge being so inclined with respect to the plane of the paddle approaching it during rotation of the rotor that material is pushed over said edge by the paddle in a progressively laterally shifting but uniformly continuous stream, and the paddles being so spaced circumferentially that the paddle immediately behind that actively pushing material over said edge starts to push material over the nearer part of said edge as the actively pushing paddle traverses the further part of said edge so that uniform controlled continuity of feed is assured.

References Cited in the file of this patent

UNITED STATES PATENTS

| | | |
|---|---|---|
| 1,461,770 | Ellis et al. | July 17, 1923 |
| 1,561,586 | Bates | Nov. 17, 1925 |
| 2,428,241 | Pottjes | Sept. 30, 1947 |
| 2,684,788 | Bland | July 27, 1954 |
| 2,754,995 | Switzer | July 17, 1956 |
| 2,898,008 | Hillwick et al. | Aug. 4, 1959 |

FOREIGN PATENTS

| | | |
|---|---|---|
| 725,834 | Great Britain | Mar. 9, 1955 |